Aug. 9, 1949.    R. C. STOLPE    2,478,510
ANTIFRICTION NUT AND LEAD SCREW
Filed Jan. 8, 1946
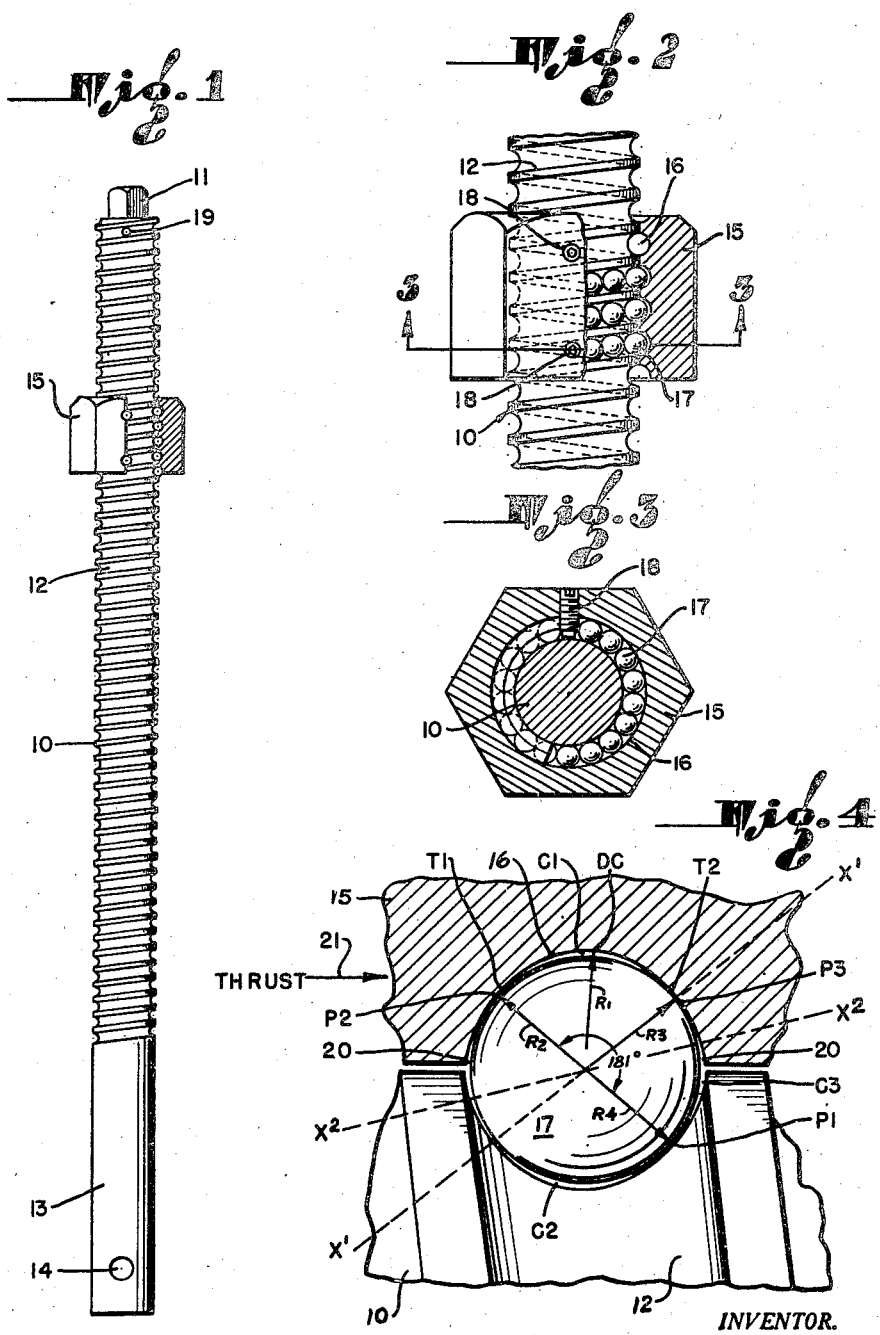
INVENTOR.
RUDOLF C. STOLPE
BY
ATTORNEY Patented Aug. 9, 1949

2,478,510

UNITED STATES PATENT OFFICE 2,478,510

ANTIFRICTION NUT AND LEAD SCREW

Rudolf Clifford Stolpe, Van Nuys, Calif.

Application January 8, 1946, Serial No. 639,728

10 Claims. (Cl. 74—459)

This invention relates generally to lead screws or the like, and relates more particularly to the construction of the joint in the lead screw that performs the function of a threaded shank and a nut, in lead screws of the usual construction.

It is an object of the present invention to provide a lead screw in which the rotation of the driving, rotary member of the structure will effect longitudinal shifting of the driven member through an anti-friction bearing between the rotary member and the shifting member.

Another object of the invention is to provide a device of this character, wherein the construction of the joint between the rotary member and the shifting member of the lead screw includes anti-frictional balls located in a ball raceway.

It has been found in previous devices having the non-circulating type of ball bearing, that the balls tend to lock when under a load, and it is a further object of the invention to provide a lead screw with a non-circulating anti-friction bearing wherein the foregoing locking difficulty is overcome.

Another object of the invention is to provide a device of this character which will operate effectively and with relative ease.

It is another object of the invention to provide a device of this character that is simple in construction and effective in operation.

In the present invention the foregoing difficulties are overcome, and the objects attained by providing an anti-friction ball bearing having a three-point contact for the balls in the raceway, there being one contact point on the race of the internal member and two contact points on the race of the external member.

Further objects of the invention will appear from the following part of the specification.

Referring to the drawings, which are for illustrative purposes only,

Fig. 1 is an elevational side view of a lead screw embodying the present invention, a portion of one member being cut away;

Fig. 2 is an enlarged fragmentary view of the same;

Fig. 3 is a section taken on line 3—3 of Fig. 2; and

Fig. 4 is an enlarged view, partly in section, showing the relation between the balls of the device and the race of the screw and the nut members.

Referring more particularly to Figs. 1, 2 and 3, the device comprises a screw or shaft member, indicated generally at 10, having a square portion 11 at one end, so that the screw member may be positively held against rotation with a wrench if necessary during operation of the device. The screw member is provided with an external, spiral or helical groove or thread 12 which extends a substantial portion of the length thereof. This groove is generally semicircular or half-round in cross section but has features which will be more fully described hereinafter. The end of the screw member 10 opposite the squared end 11 is unthreaded at 13 to provide a shank of substantially the same diameter as the major diameter of the threaded portion, and adjacent the free end of the shank is a hole 14 for reception of a retaining pin for attachment of a hook, claw or other device, such as shown in applicant's copending application for a Sleeve installing and removing tool, Serial No. 639,727, filed January 8, 1946, now abandoned. As herein disclosed, the screw member 10 is the shiftable member and is moved longitudinally by rotary movement of a nut or rotatable member indicated generally at 15. However, in its broader aspects these members are shiftable axially relative to each other.

The nut member 15 has an axial bore therein for reception of the screw member 10, and the bore is provided with an internal helical or spiral groove, as indicated at 16, said groove being generally semi-circular or half-round in cross section, but has constructional features which will be described more particular hereinafter.

When the members 10 and 15 are assembled, a plurality of anti-friction balls 17 are disposed in the raceway formed by the races or grooves of said members, said grooves being aligned as shown.

Adjacent each end of the spiral groove in the nut member 15 is a set screw 18, the ends of which extend into the groove a sufficient distance to prevent the balls from escaping therefrom when the parts are assembled and to limit or prevent movement or travel of said balls lengthwise in the groove or race of the nut. A set screw 19 is also provided in the member 10 adjacent the end 11 to prevent escape of the balls from the raceway should the nut be moved axially to a position adjacent said screw 19. The unthreaded portion 13 of the screw member 10 will, of course, prevent the balls from escaping from the raceway when the nut member is at the lower end of the screw member, as shown in the drawing.

Referring now to Fig. 4, the particular form of the races in the screw and nut members is shown, as well as the relation of the balls therein. As all the balls have the same relationship to the grooves, said relationship will be described in connection with but one ball.

In order to provide the proper operation of the present device, the helical race 16 in the nut member has a clearance C1 at the crown thereof, so that the balls do not have a chance to come into contact with the center DC or high point of the crown of said race. This clearance is provided by forming the cleared space on a radius R1 which is smaller than the radius of the balls. The radii R2 and R3 for the clearance portions 20 of the groove should be somewhat larger than the radius of the balls to insure contact of said balls with the helical race at points T1 and T2 where the radii R2 and R3 are tangent with the radius R1. The arc formed by the radius R1, from the points T1 to T2, should be approximately 91° with respect to the center of the balls.

When thrust is applied to the nut member in the direction indicated by the arrow 21, the balls make contact at the point P1 of the groove in the lead screw member 10. The point P1 is intersected by the radius R4 of the ball which has clearances C2 and C3 on opposite sides of the point P1, the ball contacting the groove at the surface point of radius R4.

Theoretically, the pressure at P1 is equal to the combined components of the pressure at P2 and P3, P2 being substantially opposite the point P1. As shown, when thrust is applied to the nut and said nut is rotated about the axis of the lead screw, the balls roll on the radius R4 of the lead screw at point P1. The balls have a tendency to pivot at point P3 and this point absorbs some of the pressure, which means that the pressure at P2 is always less than pressure at P1, because the component of P2 is equal to P1 minus the component P3. Therefore, due to the fact that the balls pivot at the point P3, some of the pressure is relieved at the point P2, thereby allowing the balls to rotate about an axis which may be on line X1—X1 or X2—X2, or the axis may be between these lines, depending upon the amount of thrust applied to the nut in relation to the screw.

The number of "ball-threads" in the nut depends upon the load which the device is designed to carry. Each of the balls absorbs its proportionate share of the total load, and the pressure of each ball is in proportion to the number of balls in the threads.

It is desirable to maintain a maximum surface hardness on the threads, combined with a maximum toughness well below the surface of said threads. This can be accomplished by the use of an alloy steel which is carburized and hardened on the surface, and treated for toughness within the core.

It is also desirable to use balls of substantial diameter in the device inasmuch as small balls have a tendency to penetrate the surface of the thread or groove in both the nut and the screw when pressure is applied to the same.

The thread may be of various leads, and screws of various diameters may be used. Where the lead of the threads is the same there would be less torque required on the nut than would be required with a nut and screw of smaller diameter, both pulling the same load.

It is to be understood that the lead of the thread of the nut be as near identical to the lead of the thread in the screw as possible. Distortion of these threads, due to heat treat or any other cause, may result in improper functioning of the device such as causing some of the balls to carry more load than their proportionate share. It is equally important to maintain uniform diameter of the threads in both the nut and the screw in order to get the best results. It is also to be understood that the points of contact of the balls with the respective races or grooves may be more than a mere point; that is, they may be small lands.

I claim:
1. In a non-circulating nut and lead screw: a member having an internal bore with a helical ball race therein; a member within said bore having an external helical ball race; said members being adapted for movement relative to each other; and balls disposed in said races and interposed between said members, the cross-sectional configuration of said races being such that the respective balls have a three-point contact only with said races, one of said contacts being with the race of one of said members, and the other contacts being with the race of the other of said members.

2. In a nut and lead screw construction, the combination of: an external member having an internal bore with a helical groove therein; a screw shaft shiftable in said bore, said shaft having an external helical groove; balls disposed in said grooves and interposed between said member and shaft, the cross-sectional configuration of said grooves being such that the respective balls have one contact with the race of said shaft and a two-point contact with the race of said member, one of said two points of contact inducing rotation of the respective balls on an axis at an angle from a line extending from the point of contact with the shaft to the other of said two points of contact with said external member; and means limiting movement of the balls lengthwise of the groove of the external member.

3. In a nut and lead screw construction, the combination of: an external member having an internal bore with a helical groove therein; an internal member within said bore having an external helical groove; balls disposed in said grooves and interposed between said members, the cross-sectional configuration of said grooves being such that the respective balls have a two-point contact with the groove of the external member and only a one-point contact with the groove of the internal member, the axis of rotation of each ball being at an angle to the radius from the center of the ball to one of the two points of contact; and means adjacent the respective ends of the groove of the internal member for limiting the movement of the balls lengthwise of said groove.

4. In a nut and lead screw construction: an external member having an internal bore with a helical groove therein; a shaft disposed for movement within said bore relative to said member and having an external helical groove; balls disposed in said grooves and interposed between said member and shaft, the cross-sectional configuration of said grooves being such that each ball has a contact with a point of the groove of the external member and has contact with a point of the groove of said shaft, said points being substantially diametrical with respect to the ball so that said ball rotates on an axis extending through said points, said ball having a second point of contact with the groove of the external member for inducing rotation of said ball on its axis when the device is actuated, said second point of contact being peripherally intermediate the first mentioned points of contact and said grooves being in spaced relation with the ball over their remaining area; and means adjacent each end of the groove in the external member for closing said ends against the escape of the balls in said groove.

5. In a nut and lead screw construction: an external member having an internal bore with an internal helical groove therein; an internal member within said bore having an external helical groove, said members being adapted for axial and rotatable movements relative to each other; balls disposed in the grooves and forming an operative connection between said members, the cross-sectional configuration of said grooves being such that each ball has a contact point with the groove of the external member and a contact point with the groove of the internal member, said points of contact being on opposite sides of the ball and so located that a line extending between said points will be to one side of the center of the ball, each ball also having a third point of contact with the groove of the external member at a point peripherally intermediate the first mentioned points and at the opposite side of the center of said ball with respect to said line, said grooves being in spaced relation with each ball over their remaining areas; and means adjacent each end of the helical groove in the external member for retaining the balls therein and for limiting travel thereof lengthwise of said groove.

6. The invention defined by claim 5, wherein the last mentioned means comprise screws.

7. The invention defined by claim 5, wherein one of the members has means for attaching accessory devices thereto.

8. The invention defined by claim 5, wherein there is means on one of the members for limiting relative axial movement of said members.

9. In a lead screw and nut construction: an external member having an internal bore with an internal helical groove therein; an internal member within said bore having an external helical groove, said members being adapted for axial and rotatable movements relative to each other; balls disposed in the grooves and forming an operative connection between said members, the cross sectional shape of the groove of the external member being such as to provide a clearance portion at the crown thereof so that the balls do not come into contact with said crown, said groove also having marginal edge clearance portions so that each ball has contact with said groove between each marginal edge clearance portion and the clearance portion at the crown, the cross sectional shape of the external groove of the internal member being such as to provide a contact for each ball substantially opposite one of the first mentioned contacts, the remaining portions of said external groove on each side of said contact being spaced from the ball, the opposed contacts being so related that a line therebetween will be to one side of the center of the ball, and the other of the first mentioned contacts being at the opposite side of the center of said ball; and means adjacent each end of the internal helical groove of the external member for retaining the balls therein and for limiting travel thereof lengthwise of the groove.

10. In a nut and lead screw construction: an external member having an internal bore with a helical groove therein; a shaft disposed for movement within said bore relative to said member and having an external helical groove; balls disposed in said grooves and interposed between said member and shaft, the cross-sectional configuration of said grooves being such that each ball has a contact with points of the grooves of the external member and shaft respectively, said points being substantially diametrical with respect to the ball and said ball having a second point of contact with the groove of the external member, said point of contact being peripherally intermediate the first mentioned substantially diametrical points of contact, and all three of these points of contact being included in an arc which covers a major portion of the periphery of said ball, thus creating a series of unbalanced or unequal forces acting on the periphery of said ball so that said ball may be induced to rotate when acted upon by the major one of these three unequal forces, said major force always being at the substantially diametrical point where the ball contacts the groove of the internal member, said grooves being in spaced relation with the ball over their remaining area; and means adjacent each end of the groove in the external member for closing said ends against the escape of the balls in said groove.

RUDOLF CLIFFORD STOLPE.

REFERENCES CITED

The following references are of record in the file of this patent:

UNITED STATES PATENTS

| Number | Name | Date |
|---|---|---|
| 477,642 | Brunthaver | June 28, 1892 |
| 992,897 | Nichols | May 23, 1911 |
| 1,310,423 | Lippert-Bruenover | July 22, 1919 |
| 1,905,039 | McKellar | May 25, 1933 |
| 2,091,268 | Coldman | Aug. 31, 1937 |
| 2,127,335 | Hogson | Aug. 16, 1938 |
| 2,214,493 | Trbojevich | Sept. 10, 1940 |
| 2,215,791 | Horowitz | Sept. 24, 1940 |